US010471995B2

(12) United States Patent
Sugawara et al.

(10) Patent No.: US 10,471,995 B2
(45) Date of Patent: Nov. 12, 2019

(54) VEHICLE BODY REAR PART STRUCTURE

(71) Applicant: HONDA MOTOR CO., LTD., Minato-ku, Tokyo (JP)

(72) Inventors: Kenta Sugawara, Wako (JP); Kengo Kishida, Wako (JP); Hirofumi Kikuchi, Haga-gun (JP); Kazutaka Kanezashi, Utsunomiya (JP); Keiichiro Okuyama, Shioya-gun (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/000,941

(22) Filed: Jun. 6, 2018

(65) Prior Publication Data

US 2019/0009822 A1 Jan. 10, 2019

(30) Foreign Application Priority Data

Jul. 6, 2017 (JP) .................................. 2017-133001

(51) Int. Cl.
*B62D 21/15* (2006.01)
*B62D 25/20* (2006.01)
(Continued)

(52) U.S. Cl.
CPC ............ *B62D 21/155* (2013.01); *B60R 19/18* (2013.01); *B60R 19/24* (2013.01); *B62D 21/152* (2013.01);
(Continued)

(58) Field of Classification Search
CPC .... B62D 21/155; B62D 21/152; B62D 25/08; B62D 25/2027; B60R 19/18; B60R 19/24
(Continued)

(56) References Cited

U.S. PATENT DOCUMENTS

| | | | |
|---|---|---|---|
| 6,830,287 B1* | 12/2004 | Aghssa ................ | B62D 25/087 280/784 |
| 2006/0197300 A1* | 9/2006 | Nakashima ............ | B60G 7/006 280/124.109 |
| 2008/0252104 A1* | 10/2008 | Yamaguchi .......... | B62D 21/152 296/203.04 |

FOREIGN PATENT DOCUMENTS

| | | |
|---|---|---|
| JP | 2004-262300 | 9/2004 |
| JP | 2012-236480 | 12/2012 |

(Continued)

OTHER PUBLICATIONS

Japanese Office Action for Japanese Patent Application No. 2017-133001 dated Feb. 26, 2019.

*Primary Examiner* — Joseph D. Pape
(74) *Attorney, Agent, or Firm* — Amin, Turocy & Watson LLP

(57) ABSTRACT

An upper side joint section that extends inward in a vehicle width direction from a vicinity of a rear side frame and a lateral side joint section that extends downward from the upper side joint section and that is separated in the vehicle width direction from the rear side frame are provided on a rear floor panel of a vehicle body rear part structure. The rear panel has: a frame joint part to which the rear side frame is joined; a first floor joint part to which the upper side joint section of the rear floor panel is joined; and a second floor joint part to which the lateral side joint section of the rear floor panel is joined. A longitudinal bead is provided on a part of the rear panel between the frame joint part and the second floor joint part. The longitudinal bead extends to a lower end of the rear panel and is opened downward.

13 Claims, 6 Drawing Sheets

(51) Int. Cl.
  *B62D 25/08* (2006.01)
  *B60R 19/18* (2006.01)
  *B60R 19/24* (2006.01)
  *B60R 19/36* (2006.01)

(52) U.S. Cl.
  CPC ......... *B62D 25/08* (2013.01); *B62D 25/2027* (2013.01); *B60R 19/36* (2013.01)

(58) Field of Classification Search
  USPC ...................................... 296/193.08, 203.04
  See application file for complete search history.

(56) References Cited

FOREIGN PATENT DOCUMENTS

| | | |
|---|---|---|
| JP | 5281630 | 9/2013 |
| JP | 2014-091346 | 5/2014 |
| JP | 2014-091347 | 5/2014 |
| JP | 2017-052355 | 3/2017 |

\* cited by examiner

VEHICLE BODY REAR PART STRUCTURE

CROSS-REFERENCE TO RELATED APPLICATION

Priority is claimed on Japanese Patent Application No. 2017-133001, filed on Jul. 6, 2017, the contents of which are incorporated herein by reference.

BACKGROUND

Field of the Invention

The present invention relates to a vehicle body rear part structure of a vehicle.

Background

As a vehicle body rear part structure, a structure is known in which a rear floor panel is installed on a pair of rear side frames that are arranged substantially along a vehicle body front-to-rear direction, a rear panel that stands in a vertical direction is joined to rear parts of the pair of rear side frames and the rear floor panel, and a rear bumper beam is supported via a pair of extensions by a rear surface of the rear panel. In the case of the vehicle body rear part structure of this type, when a relatively small impact load is externally input through the rear bumper beam, a deformation load is input to the rear panel via right and left extensions.

In the related art, a vehicle body rear part structure having an enhanced surface rigidity of the rear panel against this deformation load has been proposed (for example, refer to Japanese Patent No. 5281630).

In the vehicle body rear part structure described in Japanese Patent No. 5281630, a middle portion of a bottom wall of the rear floor panel is formed in a recess shape that is recessed downward, and a joint part that is joined to the rear panel is provided on a rear end of the rear floor panel. The joint part of the rear floor panel has: an upper side joint section that extends inward in a vehicle width direction from the vicinity of the rear side frame; and a lateral side joint section that extends downward from an inner end portion in the vehicle width direction of the upper side joint section and that is arranged to be separated in the vehicle width direction from the rear side frame. The strength of a region of the rear panel between a joint part that is joined to the rear side frame and a joint part that is joined to the lateral side joint section of the rear floor panel tends to be weak, and therefore, reinforcement longitudinal and lateral beads are provided on the region between the joint parts. The longitudinal bead and the lateral bead have a shape in which an expansion shape that expands in a vehicle body frontward direction or a vehicle body rearward direction extends in the vertical direction and in the vehicle width direction.

SUMMARY

However, the vehicle body rear part structure described in Japanese Patent No. 5281630 enhances the surface rigidity of the rear panel by providing the longitudinal bead and the lateral bead that are not easily deformed on the rear panel, and therefore, there is a possibility that stress concentrates on end portions of the longitudinal bead and the lateral bead depending on an input mode or the like of the impact load, and a very small strain (permanent strain) may occur at the end portions in the extension direction of the longitudinal bead and the lateral bead.

An object of an aspect of the present invention is to provide a vehicle body rear part structure capable of preventing strain from occurring at a rear panel when an impact load is input while enhancing the surface rigidity of the rear panel.

A vehicle body rear part structure according to an aspect of the present invention employs the following configurations.

A vehicle body rear part structure according to an aspect of the present invention includes: a pair of right and left rear side frames that are arranged substantially along a vehicle body front-to-rear direction; a rear floor panel that is provided on the pair of rear side frames; a rear panel that is arranged to stand at a rearward position of the rear side frame and that is joined to rear ends of the pair of rear side frames and a rear end of the rear floor panel; a rear bumper beam that extends substantially along a vehicle width direction on a rearward side of the rear panel; and a pair of extensions that connect together the rear panel and the rear bumper beam on an extension in a rearward direction of each of the rear side frames, wherein a joint part, which is joined to the rear panel, of a rear end of the rear floor panel has: an upper side joint section that extends inward in the vehicle width direction from a vicinity of the rear side frame; and a lateral side joint section that extends downward from an inner end portion in the vehicle width direction of the upper side joint section and that is arranged to be separated in the vehicle width direction from the rear side frame, the rear panel has: a frame joint part to which rear ends of the rear side frames are joined; a first floor joint part to which the upper side joint section is joined; and a second floor joint part to which the lateral side joint section is joined, a longitudinal bead in which an expansion shape that expands in a vehicle body frontward direction or a vehicle body rearward direction extends substantially along a vertical direction is provided on a part of the rear panel between the frame joint part and the second floor joint part, and the longitudinal bead extends to a lower end of the rear panel and is opened downward.

According to the configuration described above, it is possible to enhance the surface rigidity of the region of the rear panel between the frame joint part and the second floor joint part by the longitudinal bead that is provided on the region. When an impact load is input to the middle region in the vehicle width direction of the rear bumper beam, the load is input to the pair of extensions. The load that is input to the pair of extensions acts on the pair of rear side frames as a force that pushes and opens rear portions of the pair of rear side frames in an opposing direction. The force that is input to the rear side frame acts so as to pull the rear panel outward in the vehicle width direction. At this time, the longitudinal bead of the rear panel is deformed to be opened in a bellows shape at the opened lower end side. Thereby, it is possible to prevent stress concentrating on the lower end of the longitudinal bead. When the rear bumper beam and the rear side frame return to an original shape by a reaction force, a force that pushes and shrinks the rear panel inward in the vehicle width direction acts on the rear panel. At this time, the lower end side of the longitudinal bead of the rear panel is deformed to be shrunk in a bellows shape, and it is possible to prevent stress concentrating on the lower end of the longitudinal bead.

A reinforcement plate that connects together the frame joint part and the second floor joint part may be arranged at a higher position of the rear panel than an upper end of the longitudinal bead.

In this case, the relative displacement between the rear end of the rear side frame and the lateral side joint section of the rear floor panel is prevented by the reinforcement plate. Thereby, the vehicle body rigidity is enhanced, and the maneuvering stability of the vehicle is improved. Although the upper end side of the longitudinal bead is not opened, the relative displacement between the rear end of the rear side frame and the lateral side joint section of the rear floor panel is prevented by the reinforcement plate, and therefore, it is possible to prevent stress from concentrating on the upper end of the longitudinal bead. Accordingly, it is possible to prevent strain from occurring at the upper end of the longitudinal bead of the rear panel.

The reinforcement plate may be joined to at least any one of the frame joint part and the second floor joint part above an upper end of the longitudinal bead.

In this case, each of the frame joint part and the second floor joint part of the rear panel is joined to each of the rear end of the rear side frame and the rear end of the rear floor panel and has an enhanced rigidity, and at least any one of the joint parts is further joined by the reinforcement plate and thereby has a further enhanced rigidity. Accordingly, the rigidity at the upper position of the upper end of the longitudinal bead of the rear panel is enhanced by the joint part of the reinforcement plate, and it is possible to reliably prevent stress from concentrating on the upper end of the longitudinal bead when an impact load is input. As a result, it is possible to further reliably prevent strain from occurring at the rear panel when an impact load is input.

The reinforcement plate may be arranged close to an upper end of the longitudinal bead.

In this case, a region of the rear panel of which the rigidity is enhanced by the reinforcement plate is close to the upper end of the longitudinal bead, and therefore, it is possible to reliably prevent stress from concentrating on the upper end of the longitudinal bead when an impact load is input.

The longitudinal bead may be arranged below a horizontal line that passes through a center of the pair of rear side frames, and the reinforcement plate may be arranged above the horizontal line that passes through the center of the pair of rear side frames.

In this case, an opened lower end region of the longitudinal bead is positioned at a lower side than the center of the rear side frame, and the reinforcement plate that regulates the approach and separation between the rear side frame and the lateral side joint section is arranged above the center of the rear side frame. Therefore, it is possible to accept the expansion and contraction deformation in the vehicle width direction of the lower region than the center of the rear side frame of the rear panel while preventing the deformation of the upper region than the center of the rear side frame of the rear panel. Accordingly, by employing this configuration, it is possible to prevent strain of the rear panel from occurring while improving the vehicle body rigidity.

The rear bumper beam may include a beam main body that is joined to the pair of extensions and a supplementary beam that is provided on a part in the vehicle width direction of the beam main body, and the supplementary beam may be arranged above a horizontal line that passes through a center of the pair of rear side frames.

In this case, when another vehicle having a high bumper height collides from the rearward direction, the bumper of another vehicle comes into contact with the supplementary beam of the rear bumper beam. At this time, it is possible to absorb an impact energy by the supplementary beam, the beam main body, and the like. Further, when an impact load is input via the supplementary beam to the bumper main body, a moment that is directed toward a front lower part acts on the rear bumper beam, and a force that pulls the lower edge side of the rear panel outward in the vehicle width direction greatly acts on the lower edge side of the rear panel by the moment.

At this time, the lower end side of the longitudinal bead of the rear panel is opened in a bellows shape, and thereby, it is possible to prevent strain of the rear panel from occurring.

According to an aspect of the present invention, the longitudinal bead that extends to the lower end of the rear panel and that is opened downward is provided on the part of the rear panel between the frame joint part and the second floor joint part, and therefore, it is possible to prevent stress from concentrating on the lower end of the longitudinal bead by the deformation in a bellows shape of the opened lower end side of the longitudinal bead when an impact load is input while enhancing the surface rigidity of the rear panel by the longitudinal bead. Therefore, according to an aspect of the present invention, it is possible to prevent strain from occurring at the rear panel when an impact load is input while enhancing the surface rigidity of the rear panel.

DESCRIPTION OF THE EMBODIMENTS

Figure 1:
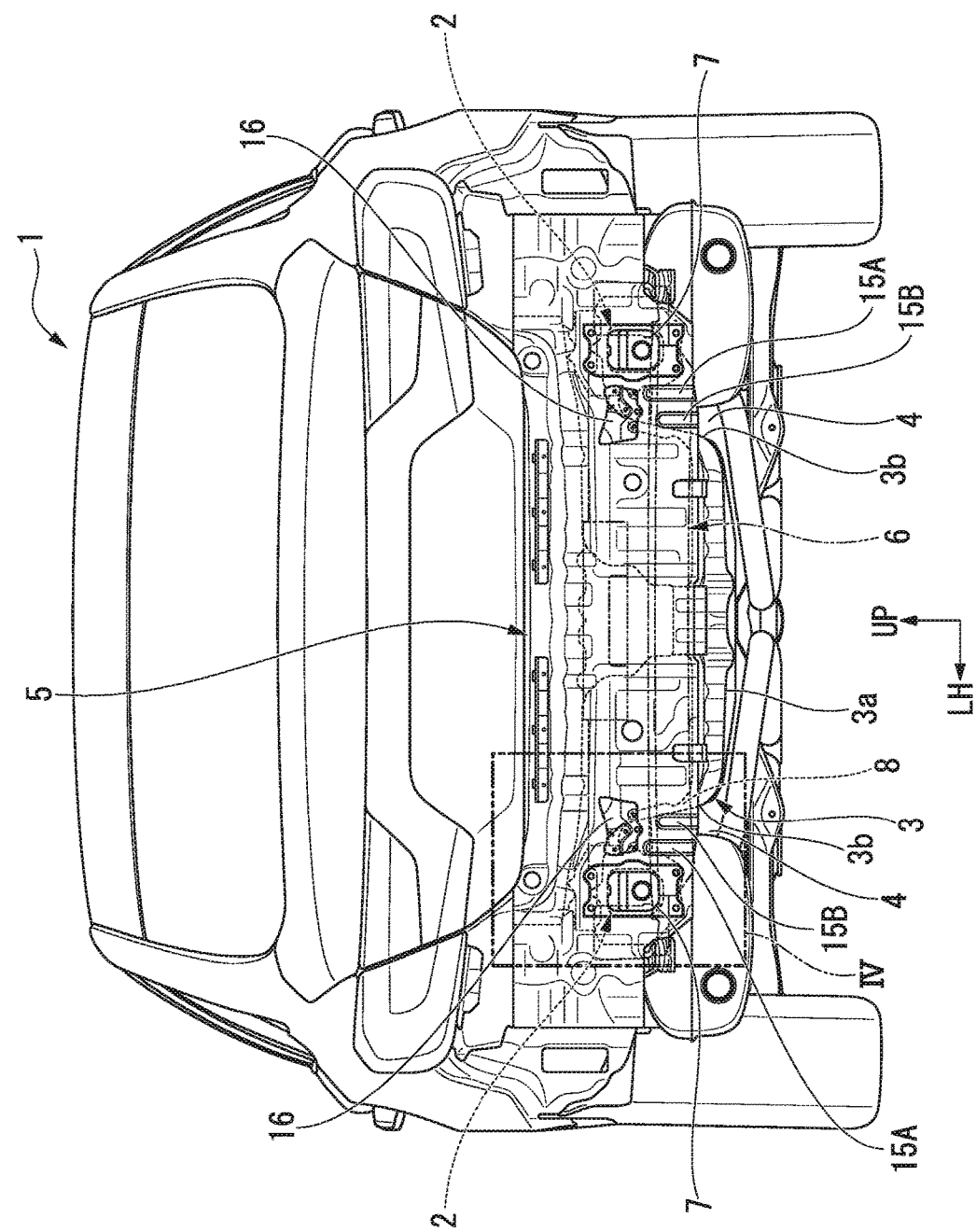
FIG. 1 is a rear surface view of a vehicle of an embodiment of the present invention.

Hereinafter, an embodiment of the present invention will be described with reference to the drawings. In the following description, front-to-rear, vertical, and right-to-left directions mean front-to-rear, vertical, and right-to-left directions of a vehicle 1 unless otherwise specified. In the drawings, an arrow FR indicates a frontward direction of the vehicle 1, an arrow UP indicates an upward direction of the vehicle 1, and an arrow LH indicates a leftward direction of the vehicle.

Figure 2:
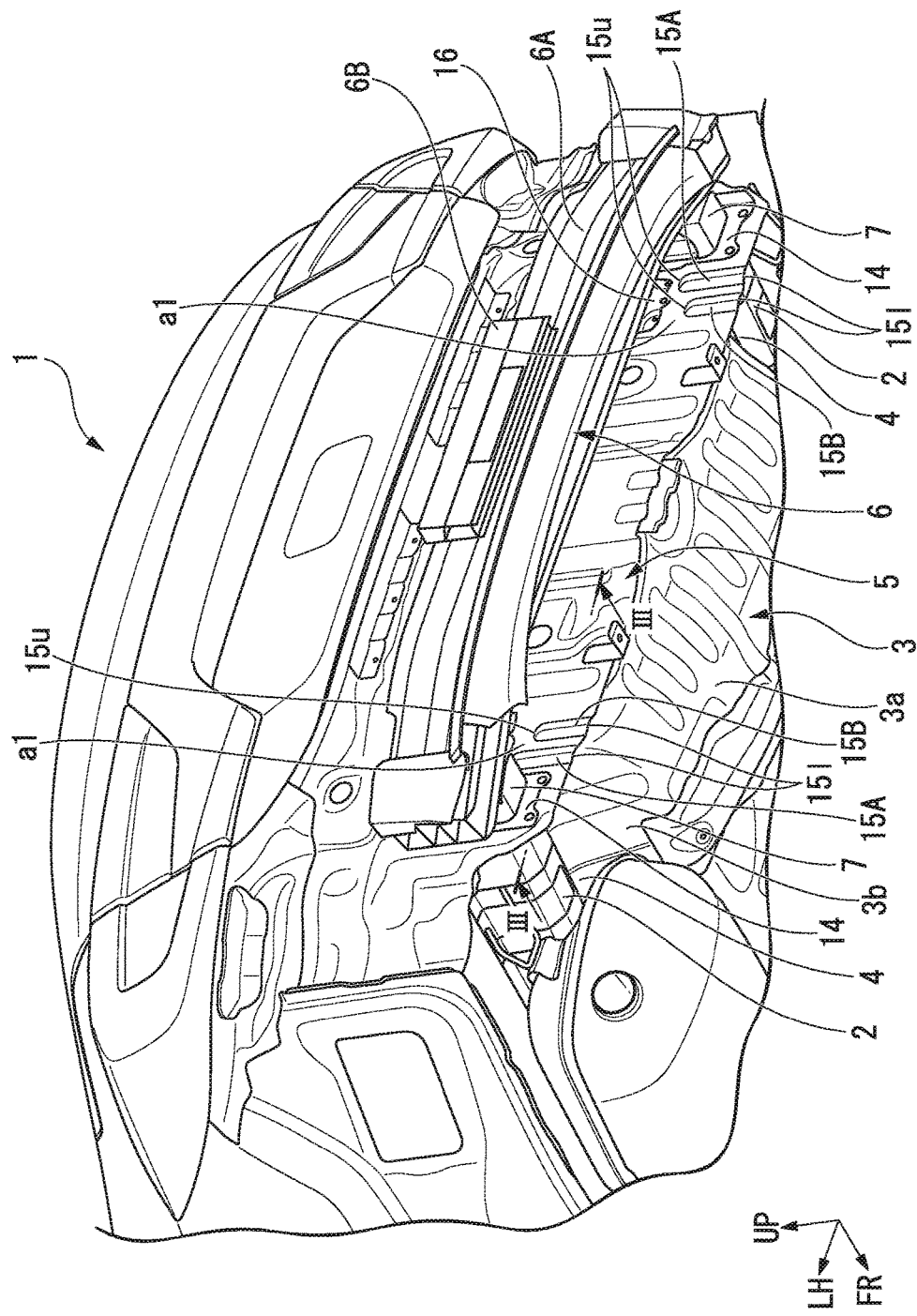
FIG. 2 is a perspective view of a rear part of the vehicle of the embodiment of the present invention.
Figure 3:
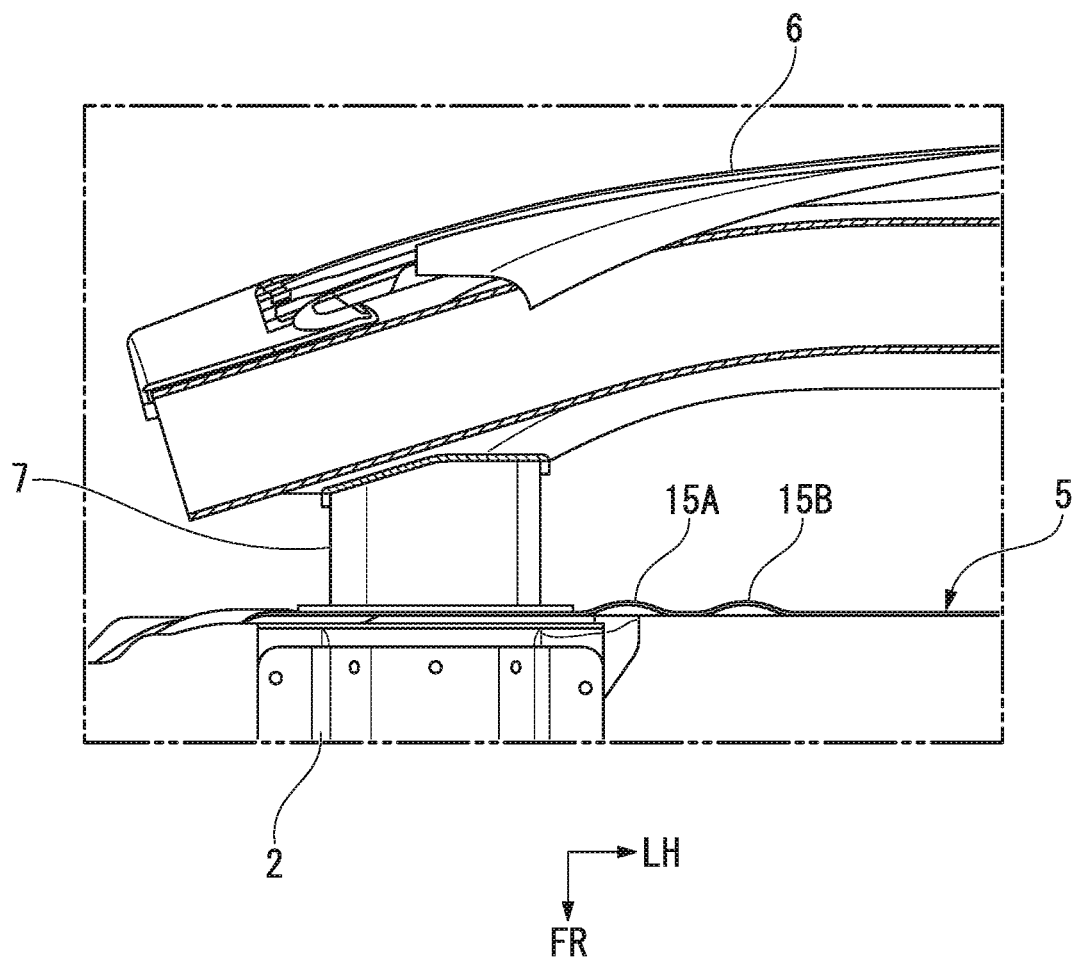
FIG. 3 is a cross-sectional view along a line of FIG. 2 of the vehicle of the embodiment of the present invention.

FIG. 1 is a rear surface view of a vehicle body rear part in which some of members are removed from the vehicle 1 of the present embodiment. FIG. 2 is a view seen from a rearward, leftward, and diagonally downward direction of the vehicle body rear part of the vehicle 1. FIG. 3 is a view showing a cross-section along a line of FIG. 2.

Each of a pair of rear side frames 2 that extends substantially along a vehicle body front-to-rear direction is arranged on each of right and left sides of a rear lower part of the vehicle. The right and left rear side frames 2 are formed in a basic cross-sectional shape having a longitudinally elongated substantially rectangular shape. Front edge parts of the right and left rear side frames 2 are joined to each other by a cross member (not shown) that extends substantially along a vehicle width direction. A front edge part of each of the right and left rear side frames 2 is joined to a side sill (not shown) which is a strengthening member of a vehicle body side part.

A rear floor panel 3 of which a middle region in the vehicle width direction is recessed downward in a recess shape is provided on the right and left rear side frames 2. The rear floor panel 3 has a bottom wall 3a, a side wall 3b that stands upward from each of right and left sides of the bottom wall 3a, and a lateral upper wall (not shown) that extends outward in the vehicle width direction from an upper end part of the side wall 3b. Each of right and left lateral upper walls of the rear floor panel 3 is joined to an upper part of a corresponding rear side frame of the right and left rear side frames 2. Accordingly, a recess space 4 that opens at a vehicle body lower side and that extends substantially along the vehicle body front-to-rear direction is provided between an inner lateral surface in the vehicle width direction of the right and left rear side frames 2 and the side wall 3b of the rear floor panel 3.

A rear panel 5 that extends substantially along the vehicle width direction is arranged in a standing state on a rearward side of the right and left rear side frames 2. The rear panel 5 is a metal panel having a laterally elongated substantially rectangular shape. A front surface of the rear panel 5 is joined to a rear end of each of the right and left rear side frames 2 and a rear end of the rear floor panel 3.

A rear bumper beam 6 that extends substantially along the vehicle width direction is arranged on a rearward side of the rear panel 5. In FIG. 2, the rear bumper beam 6 is shown by an imaginary line. An extension 7 that protrudes toward a vehicle body rearward direction is joined to a rear surface of the rear panel 5 at a position on an extension in the vehicle body rearward direction of each of the right and left rear side frames 2. The rear bumper beam 6 is joined to rear end parts of right and left extensions 7. The right and left extensions 7 connects together the rear panel 5 and the rear bumper beam 6 and substantially extends the right and left rear side frames 2 toward the vehicle body rearward direction so as to interpose the rear panel 5. The extensions 7 are formed in a cross-sectional shape having substantially the same shape as the rear side frame 2 on the frontward side.

Figure 4:
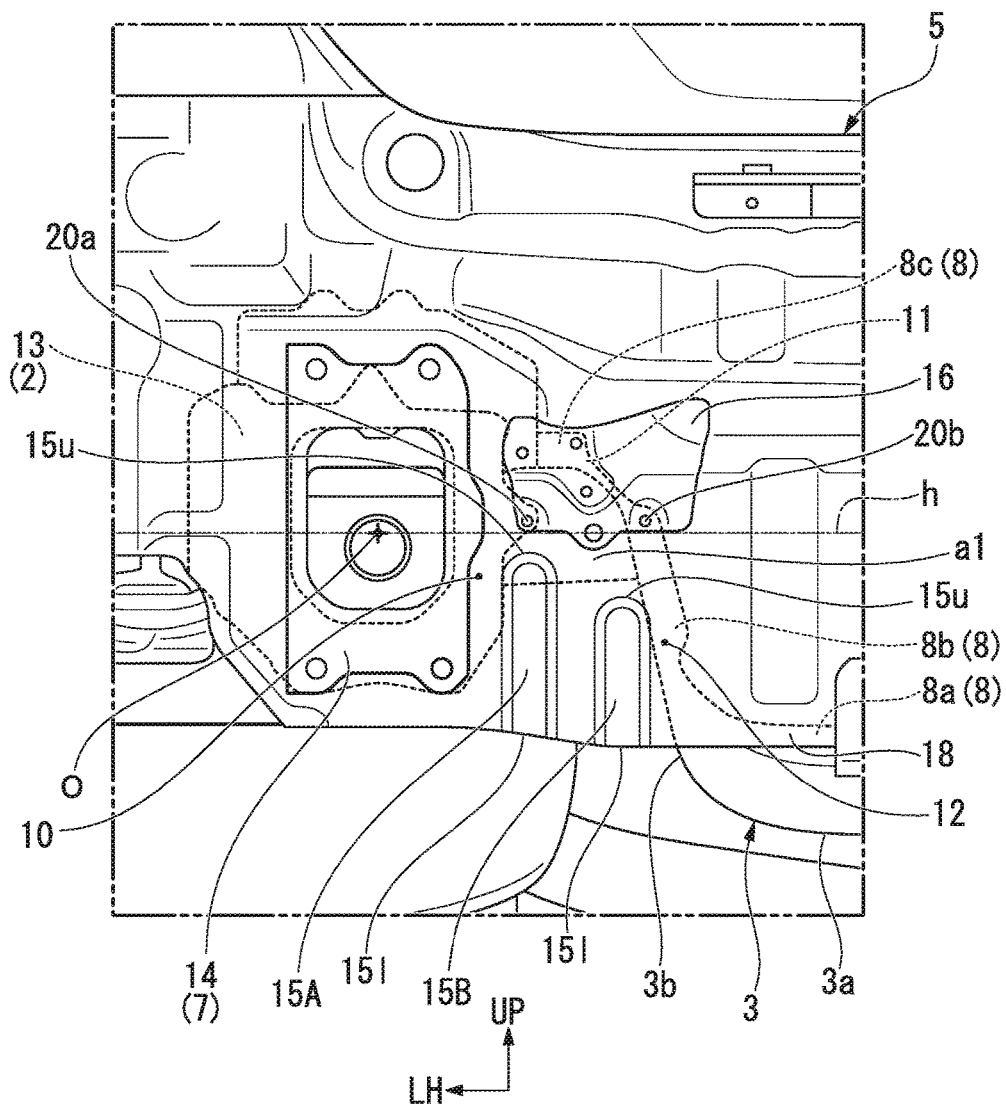
FIG. 4 is an enlarged view of an IV part in FIG. 1 of the vehicle of the embodiment of the present invention.
Figure 5:
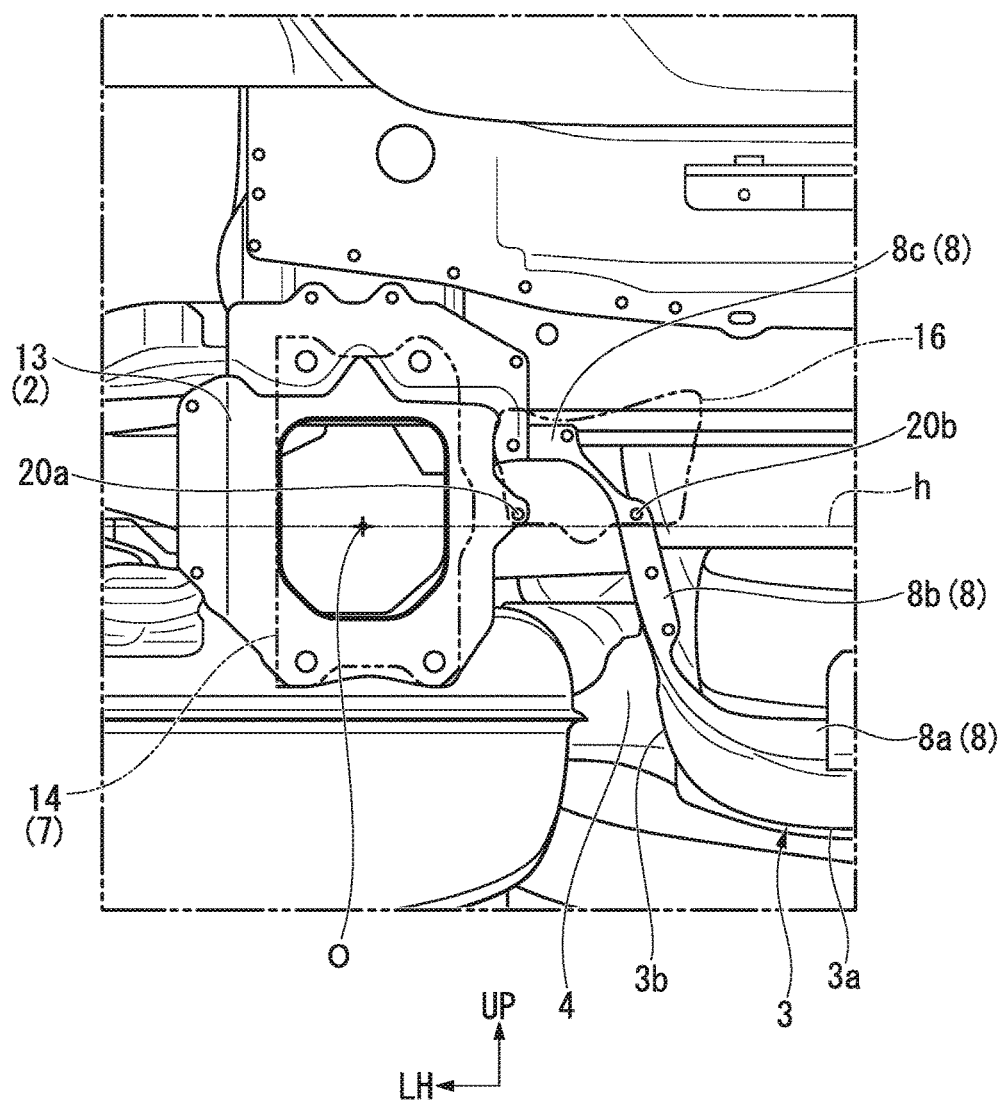
FIG. 5 is a rear surface view similar to FIG. 4 in which some of the members are removed from the vehicle of the embodiment of the present invention.

FIG. 4 is an enlarged view showing an IV part of FIG. 1. FIG. 5 is a view similar to FIG. 4 in which the rear panel 5 is removed from FIG. 4.

As shown in FIG. 5, a joint part 8 that is joined to the rear panel 5 is provided on a rear end of the rear floor panel 3. The joint part 8 of the rear floor panel 3 includes: an upper side joint section 8c that extends inward in the vehicle width direction from the vicinity of an inner upper end in the vehicle width direction of the right and left rear side frames 2; a lateral side joint section 8b that extends downward from an inner end portion in the vehicle width direction of the upper side joint section 8c and that is arranged to be separated in the vehicle width direction from a rear side frame 2 on the same side among the right and left rear side frames 2; and a bottom wall side joint section 8a that extends inward in the vehicle width direction from a lower end of the lateral side joint section 8b. The upper side joint section 8c is a joint section that is provided on an end portion of the lateral upper wall of the rear floor panel 3. The lateral side joint section 8b is a joint section that is provided on an end portion of the side wall 3b of the rear floor panel 3. The bottom wall side joint section 8a is a joint section that is provided on an end portion of the bottom wall 3a of the rear floor panel 3 and is arranged substantially horizontally in a middle region in the vehicle width direction.

As shown in FIG. 4, the rear panel 5 has: a frame joint part 10 to which a rear end of each of the right and left rear side frames 2 is joined; a first floor joint part 11 to which the upper side joint section 8c of the rear floor panel 3 is joined; a second floor joint part 12 to which the lateral side joint section 8b of the rear floor panel 3 is joined; and a third floor joint part 18 to which the bottom wall side joint section 8a of the rear floor panel 3 is joined. A non-joint region a1 that has a longitudinally elongated mountain shape and that is surrounded by the frame joint part 10, the first floor joint part 11, and the second floor joint part 12 is provided on right and left side edge parts of the rear panel 5. The non-joint region a1 is a region to which the joint part 8 on the rear floor panel 3 side is not joint.

A joint flange 13 in FIG. 4 and FIG. 5 is provided on a rear end of the rear side frame 2 and is joined to a front surface of the rear panel 5. A joint flange 14 is provided on a front end of the extension 7 and is joined to a rear surface of the rear panel 5.

Two longitudinal beads 15A, 15B in which an expansion shape that expands toward a vehicle body rearward direction extends substantially along the vertical direction are provided in the non-joint region a1 of the rear panel 5 between the frame joint part 10 and the second floor joint part 12. The two longitudinal beads 15A, 15B are arranged parallel with each other and to be separated in the vehicle width direction, and the extension length in the upward direction of the longitudinal bead 15A close to the frame joint part 10 is set to be longer than the extension length in the upward direction of the longitudinal bead 15B close to the second floor joint part 12.

Each of the longitudinal beads 15A, 15B extends to the lower end of the rear panel 5 and is opened downward. That is, a lower end 15l of each of the longitudinal beads 15A, 15B is not closed in a semispherical shape like an upper end 15u and has an end surface shape that is opened in a substantially U shape.

The number and the extension length of longitudinal beads that are provided between the frame joint part 10 and the second floor joint part 12 of the rear panel 5 are not limited to those of the present embodiment and are arbitrary. Further, the expansion direction of the longitudinal bead is not necessarily the rearward direction but may be the frontward direction.

Further, a reinforcement plate 16 that connects together the frame joint part 10 and the second floor joint part 12 is joined to the rear surface of the rear panel 5 at a higher position than the upper end 15u of the longitudinal beads 15A, 15B. The reinforcement plate 16 is formed of a thick metal plate and the like. The reinforcement plate 16 is joined to the frame joint part 10 and the second floor joint part 12 on the rear panel 5 above the upper end 15u of each of the longitudinal beads 15A, 15B. The reinforcement plate 16 is arranged close to the upper end 15u of the longitudinal bead 15A close to the rear side frame 2 on the rear panel 5.

A joint point 20a in FIG. 4 and FIG. 5 is a joint point at which the reinforcement plate 16 is joined to the rear panel 5 (frame joint part 10) and the rear side frame 2 (joint flange 13). A joint point 20b is a joint point at which the reinforcement plate 16 is joined to the rear panel 5 (second floor joint part 12) and the rear floor panel 3 (lateral side joint section 8b).

The longitudinal beads 15A, 15B on the rear panel 5 are arranged on the lower side with respect to a horizontal line h that passes through centers o (cross-sectional centers) of the right and left rear side frames 2. On the other hand, the reinforcement plate 16 is arranged on the upper side with respect to the horizontal line h that passes through the centers o (cross-sectional centers) of the right and left rear side frames 2.

Figure 6:
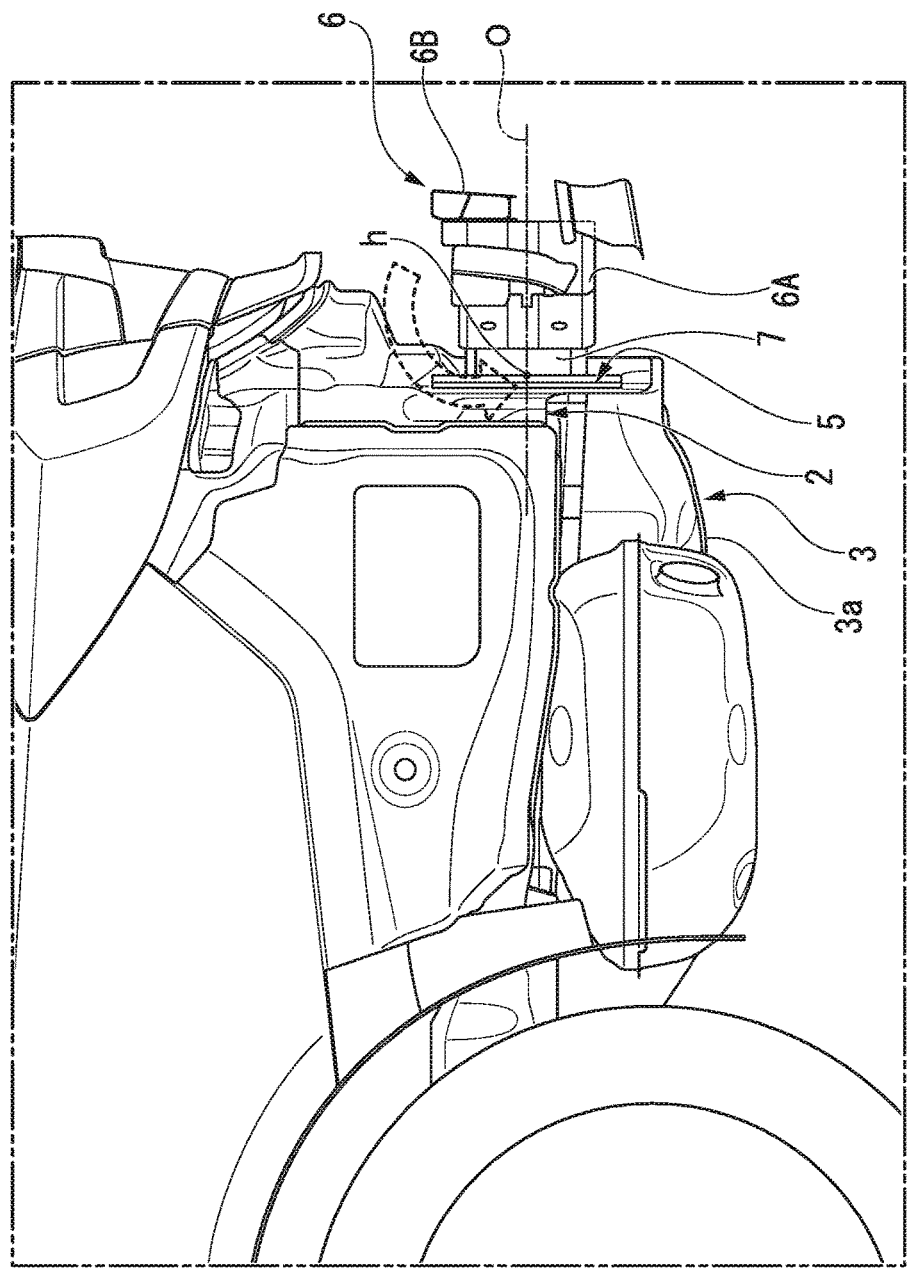
FIG. 6 is a side surface view of a rear part of the vehicle of the embodiment of the present invention.

FIG. 6 is a view seen from the leftward direction of the rear part of the vehicle 1 in which some of the members are removed.

As shown in FIG. 2 and FIG. 6, the rear bumper beam 6 includes a beam main body 6A that extends in the vehicle width direction and that is joined to the right and left extensions 7 and a supplementary beam 6B that is attached to a middle region in the vehicle width direction of the rear part of the beam main body 6A. The supplementary beam 6B is arranged at a higher position than the horizontal line h that passes through the centers o (cross-sectional centers) of the right and left rear side frames as shown in FIG. 6.

In the configuration described above, when a light impact load is input from the vehicle rearward direction to the middle region in the vehicle width direction of the rear bumper beam 6, the load is input to the right and left extensions 7 while bending the rear bumper beam 6. The load that is input to the right and left extensions 7 is transmitted to each of the rear side frames 2 while allowing a component force that pushes and opens the rear end outward in the vehicle width direction to act on the right and left rear side frames 2. The component force that is input to the right and left rear side frames 2 acts on the rear panel 5 so as to pull the rear panel 5 outward in the vehicle width direction. At this time, in the non-joint region al at right and left lower edges of the rear panel 5, the lower end side of the longitudinal beads 15A, 15B is opened rightward and leftward in a bellows shape, and as a result, stress concentrating on the lower end 15l of the longitudinal beads 15A, 15B is prevented.

Further, after an impact load is input, when the rear bumper beam 6 and the rear side frame 2 return to an original shape by a reaction force, a force that pushes and shrinks the rear panel 5 inward in the vehicle width direction acts on the rear panel 5 through the rear bumper beam 6. At this time, in the non-joint region al at right and left lower edges of the rear panel 5, the lower end side of the longitudinal beads 15A, 15B is deformed to be shrunk in a bellows shape, and as a result, stress concentrating on the lower end 15l of the longitudinal beads 15A, 15B is prevented.

As described above, in the vehicle body rear part structure of the present embodiment, the longitudinal beads 15A, 15B that extend to the lower end of the rear panel 5 and that are opened downward are provided on a part of the rear panel 5 between the frame joint part 10 and the second floor joint part 12. Therefore, it is possible to prevent stress from concentrating on the lower end 15l of the longitudinal beads 15A, 15B by the deformation in a bellows shape of the lower end side of the longitudinal beads 15A, 15B when a light impact load is input while enhancing the surface rigidity of the rear panel 5 by the longitudinal beads 15A, 15B.

Accordingly, when the vehicle body rear part structure of the present embodiment is employed, it is possible to prevent strain from occurring at the rear panel 5 when an impact load is input while enhancing the surface rigidity of the rear panel 5.

Further, in the vehicle body rear part structure of the present embodiment, the reinforcement plate 16 that connects together the frame joint part 10 and the second floor joint part 12 is arranged at a higher position of the rear panel 5 than the upper end 15u of the longitudinal beads 15A, 15B. Therefore, it is possible to prevent the relative displacement in the vehicle width direction between the rear end of the rear side frame 2 and the lateral side joint section 8b of the rear floor panel 3 by the reinforcement plate 16. As a result, the vehicle body rigidity is enhanced, and the maneuvering stability of the vehicle is enhanced.

Further, in the vehicle body rear part structure of the present embodiment, the relative displacement between the rear end of the rear side frame 2 and the lateral side joint section 8b of the rear floor panel 3 is prevented by the reinforcement plate 16, and therefore, it is possible to prevent stress from concentrating on the upper end 15u of the longitudinal beads 15A, 15B when a light impact load is input. Accordingly, when the vehicle body rear part structure of the present embodiment is employed, it is also possible to prevent strain from occurring at the upper end 15u of the longitudinal beads 15A, 15B of the rear panel 5.

Further, in the vehicle body rear part structure of the present embodiment, the reinforcement plate 16 is joined to the frame joint part 10 and the second floor joint part 12 of the rear panel 5 above the upper end 15u of the longitudinal beads 15A, 15B, and therefore, the rigidity of the rear panel 5 at an upper position of the upper end 15u of the longitudinal beads 15A, 15B is effectively enhanced by the joint part of the three members. Accordingly, when this configuration is employed, it is possible to reliably prevent stress from concentrating on the upper end 15u of the longitudinal beads 15A, 15B when a light impact load is input.

In the present embodiment, the reinforcement plate 16 is joined to the frame joint part 10 and the second floor joint part 12 of the rear panel 5 above the upper end 15u of the longitudinal beads 15A, 15B; however, the reinforcement plate 16 may be joined to only any one of the frame joint part 10 and the second floor joint part 12 of the rear panel 5.

Specifically, in the case of the vehicle body rear part structure of the present embodiment, the reinforcement plate 16 is arranged close to the upper end 15u of the longitudinal bead 15A close to the rear side frame 2, and therefore, the region of which the rigidity is enhanced by the reinforcement plate 16 is close to the upper end 15u of the longitudinal bead 15A. Therefore, it is possible to further reliably prevent stress from concentrating on the upper end 15u of the longitudinal bead 15A when a light impact load is input.

Further, in the vehicle body rear part structure of the present embodiment, the longitudinal beads 15A, 15B are arranged below the horizontal line h that passes through the center o of the rear side frame 2, and the reinforcement plate 16 is arranged above the horizontal line h that passes through the center o of the rear side frame 2. Therefore, it is possible to flexibly deform the lower end region of the longitudinal beads 15A, 15B to be expanded and contracted in the lower region of the rear panel 5 on which an expansion and contraction load along the vehicle width direction easily acts when a light impact load is input while preventing the deformation of the upper region of the rear panel 5 by the reinforcement plate 16. Accordingly, when this configuration is employed, it is possible to prevent strain of the rear panel 5 from occurring while improving the vehicle body rigidity.

Further, in the vehicle body rear part structure of the present embodiment, the supplementary beam 6B is provided on the middle region in the vehicle width direction of the rear part of the beam main body 6A of the rear bumper beam 6, and the supplementary beam 6B is arranged above the horizontal line h that passes through the center o of the right and left rear side frames 2. Therefore, when another vehicle having a high bumper height collides from the rearward direction, it is possible to receive an impact load from another vehicle by the supplementary beam 6B, and it is possible to efficiently absorb an impact energy by the supplementary beam 6B and the beam main body 6A.

Further, when an impact load is input via the supplementary beam 6B to the beam main body 6A, a moment that is directed toward a front lower part acts on the rear bumper beam 6 as shown by an arrow in FIG. 6.

In the vehicle body rear part structure of the present embodiment, the supplementary beam 6B is arranged above the horizontal line h that passes through the center o of the right and left rear side frames 2, and therefore, by a moment that acts on the rear bumper beam 6 and that is directed toward a front lower part, a force that pulls the lower edge side of the rear panel 5 outward in the vehicle width direction greatly acts on the lower edge side of the rear panel 5. At this time, the lower end region of the longitudinal beads 15A, 15B of the rear panel 5 is expanded and contracted in a bellows shape, and thereby, it is possible to prevent strain from occurring at the rear panel 5.

The present invention is not limited to the embodiment described above, and a variety of design changes can be made without departing from the scope of the invention.

What is claimed is:

1. A vehicle body rear part structure, comprising:
   a pair of right and left rear side frames that are arranged substantially along a vehicle body front-to-rear direction;
   a rear floor panel that is provided on the pair of rear side frames;
   a rear panel that is arranged to stand at a rearward position of the pair of rear side frames and that is joined to rear ends of the pair of rear side frames and a rear end of the rear floor panel;
   a rear bumper beam that extends substantially along a vehicle width direction on a rearward side of the rear panel; and
   a pair of extensions that connect together the rear panel and the rear bumper beam on an extension in a rearward direction of each of the rear side frames,
   wherein a joint part, which is joined to the rear panel, of a rear end of the rear floor panel has:
       an upper side joint section that extends inward in the vehicle width direction from a vicinity of each of the rear side frames; and
       a lateral side joint section that extends downward from an inner end portion in the vehicle width direction of the upper side joint section and that is arranged to be separated in the vehicle width direction from each of the rear side frames,
   the rear panel has:
       a frame joint part to which rear ends of the rear side frames are joined;
       a first floor joint part to which the upper side joint section is joined; and
       a second floor joint part to which the lateral side joint section is joined,
       a longitudinal bead in which an expansion shape that expands in a vehicle body frontward direction or a vehicle body rearward direction extends substantially along a vertical direction is provided on a part of the rear panel between the frame joint part and the second floor joint part, and
       the longitudinal bead extends to a lower end of the rear panel and is opened downward.

2. The vehicle body rear part structure according to claim 1,
   wherein a reinforcement plate that connects together the frame joint part and the second floor joint part is arranged at a higher position of the rear panel than an upper end of the longitudinal bead.

3. The vehicle body rear part structure according to claim 2,
   wherein the reinforcement plate is joined to at least any one of the frame joint part and the second floor joint part above an upper end of the longitudinal bead.

4. The vehicle body rear part structure according to claim 2,
   wherein the reinforcement plate is arranged close to an upper end of the longitudinal bead.

5. The vehicle body rear part structure according to claim 3,
   wherein the reinforcement plate is arranged close to an upper end of the longitudinal bead.

6. The vehicle body rear part structure according to claim 2,
   wherein the longitudinal bead is arranged below a horizontal line that passes through a center of the pair of rear side frames, and the reinforcement plate is arranged above the horizontal line that passes through the center of the pair of rear side frames.

7. The vehicle body rear part structure according to claim 3,
   wherein the longitudinal bead is arranged below a horizontal line that passes through a center of the pair of rear side frames, and the reinforcement plate is arranged above the horizontal line that passes through the center of the pair of rear side frames.

8. The vehicle body rear part structure according to claim 4,
   wherein the longitudinal bead is arranged below a horizontal line that passes through a center of the pair of rear side frames, and the reinforcement plate is arranged above the horizontal line that passes through the center of the pair of rear side frames.

9. The vehicle body rear part structure according to claim 5,
   wherein the longitudinal bead is arranged below a horizontal line that passes through a center of the pair of rear side frames, and the reinforcement plate is arranged above the horizontal line that passes through the center of the pair of rear side frames.

10. The vehicle body rear part structure according to claim 6,
    wherein the rear bumper beam comprises a beam main body that is joined to the pair of extensions and a supplementary beam that is provided on a part in the vehicle width direction of the beam main body, and
    the supplementary beam is arranged above a horizontal line that passes through a center of the pair of rear side frames.

11. The vehicle body rear part structure according to claim 7,
    wherein the rear bumper beam comprises a beam main body that is joined to the pair of extensions and a supplementary beam that is provided on a part in the vehicle width direction of the beam main body, and
    the supplementary beam is arranged above a horizontal line that passes through a center of the pair of rear side frames.

12. The vehicle body rear part structure according to claim 8,
    wherein the rear bumper beam comprises a beam main body that is joined to the pair of extensions and a supplementary beam that is provided on a part in the vehicle width direction of the beam main body, and
    the supplementary beam is arranged above a horizontal line that passes through a center of the pair of rear side frames.

13. The vehicle body rear part structure according to claim 9,
   wherein the rear bumper beam comprises a beam main body that is joined to the pair of extensions and a supplementary beam that is provided on a part in the vehicle width direction of the beam main body, and
   the supplementary beam is arranged above a horizontal line that passes through a center of the pair of rear side frames.

* * * * *